(12) United States Patent
Beyreis et al.

(10) Patent No.: US 9,424,362 B2
(45) Date of Patent: Aug. 23, 2016

(54) STORING AND PUBLISHING CONTENTS OF A CONTENT STORE

(75) Inventors: Rob Beyreis, Woodinville, WA (US);
Roger Keller, Redmond, WA (US);
Hadi Bandrio, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 12/972,387

(22) Filed: Dec. 17, 2010

(65) Prior Publication Data

US 2012/0158673 A1    Jun. 21, 2012

(51) Int. Cl.
*G06F 17/30* (2006.01)

(52) U.S. Cl.
CPC ................. *G06F 17/3089* (2013.01)

(58) Field of Classification Search
CPC .................................. G06F 17/3089
USPC ......................................... 707/802
See application file for complete search history.

(56) References Cited

U.S. PATENT DOCUMENTS

| | | | |
|---|---|---|---|
| 5,353,337 A * | 10/1994 | Tsumura et al. | 379/93.08 |
| 5,806,065 A * | 9/1998 | Lomet | G06F 17/30327 707/610 |
| 6,012,071 A | 1/2000 | Krishna | |
| 6,236,988 B1 | 5/2001 | Aldred | |
| 6,772,396 B1 * | 8/2004 | Cronin et al. | 715/202 |
| 7,492,877 B2 * | 2/2009 | Yamagishi et al. | 379/102.01 |
| 2004/0193583 A1 * | 9/2004 | Suzuki et al. | 707/3 |
| 2005/0123109 A1 * | 6/2005 | Yamagishi et al. | 379/102.01 |
| 2006/0168226 A1 * | 7/2006 | Miller et al. | 709/226 |
| 2007/0078904 A1 * | 4/2007 | Yoon et al. | 707/200 |
| 2009/0028087 A1 * | 1/2009 | Nguyen et al. | 370/316 |
| 2009/0029644 A1 * | 1/2009 | Sue et al. | 455/3.02 |
| 2009/0030764 A1 * | 1/2009 | Sue | 705/8 |

(Continued)

FOREIGN PATENT DOCUMENTS

CN    1860466 A    11/2006

OTHER PUBLICATIONS

Cheung, et al. "Dynamic Load Balancing in Distributed Content-based Publish/Subscribe". ACM Middleware 2006. Available online at [http://oldmsrg.msrg.utoronto.ca/padres/LBMW06.pdf]. 21 pages.

(Continued)

*Primary Examiner* — James Trujillo
*Assistant Examiner* — Hubert Cheung
(74) *Attorney, Agent, or Firm* — Bryan Webster; Doug Barker; Micky Minhas

(57) ABSTRACT

Aspects are disclosed for publishing contents of a content store. A storage operation is performed, and a completion of the storage operation is detected. Here, the storage operation redundantly stores contents of a content set onto instances associated with a content store. The contents stored in the instances are then published in response to the completion of the storage operation. In another aspect, a dataset table is generated to facilitate storing contents of a content set, which include payload and metadata. The payload is stored onto a payload table, and the metadata is stored onto a metadata table. For this embodiment, the dataset table includes a first foreign key to the payload table, whereas the metadata table includes a second foreign key to the dataset table. The dataset table is monitored to determine a storage status of the contents, and the contents are subsequently published based on the storage status.

16 Claims, 12 Drawing Sheets

(56) References Cited

U.S. PATENT DOCUMENTS

| | | | | |
|---|---|---|---|---|
| 2009/0031354 A1* | 1/2009 | Riley et al. | | 725/46 |
| 2009/0031363 A1* | 1/2009 | Riley et al. | | 725/64 |
| 2009/0031364 A1* | 1/2009 | Riley et al. | | 725/68 |
| 2009/0031367 A1* | 1/2009 | Sue | | 725/87 |
| 2009/0031370 A1* | 1/2009 | Riley et al. | | 725/93 |
| 2009/0031376 A1* | 1/2009 | Riley et al. | | 725/105 |
| 2009/0031389 A1* | 1/2009 | Riley | | 725/134 |
| 2009/0037373 A1* | 2/2009 | Gilbert | | 707/3 |
| 2010/0161729 A1 | 6/2010 | Leblanc | | |
| 2011/0201363 A1* | 8/2011 | Shim et al. | | 455/466 |

OTHER PUBLICATIONS

Michlmayr, et al. "Integrating distributed object transactions with wide-area content-based publish/subscribe systems". Published Jun. 20, 2005. Available online at [http://ieeexplore.ieee.org//xpls/abs_all.jsp?arnumber=1437203]. 6 pages.

Hu, et al. "Client Mobility in Distributed Content-Based Publish/Subscribe Systems". MSRG Technical Report, University of Toronto, Nov. 2007. Available online at [http://research.msrg.utoronto.ca/pub/Padres/WebHome/clientmobility_techreport2007.pdf]. 12 pages.

Joshi, et al. "Building a effective real-time distributed publish-subscribe framework". EE Times. Sep. 8, 2006. Published online at [http://www.eetimes.com/design/industrial-control/4006689/Building-a-effective-real-time-distributed-publish-subscribe-framework-Part-1]. 9 pages.

Ramasubramanian, et al. "Corona: A High Performance Publish-Subscribe System for the World Wide Web". Published 2006. Available online at [http://research.microsoft.com/en-us/people/rama/corona-nsdi.paper.pdf]. 14 pages.

Banavar, et al. "An Efficient Multicast Protocol for Content-Based Publish-Subscribe Systems". Published 1999. Available online at [http://ieeexplore.ieee.org/stamp/stamp.jsp?arnumber=00776528]. 11 pages.

"First Office Action Received in Chinese Patent Application No. 201110426257.X", Mailed Date: Feb. 18, 2014, Filed Date: Dec. 19, 2011, 13 Pages.

"Second Office Action and Search Report Issued in Chinese Patent Application No. 201110426257.X", Mailed Date: Sep. 4, 2014, 16 Pages.

"Office Action Issued in Chinese Patent Application No. 201110426257.X", Mailed Date: Jan. 13, 2015, 11 Pages.

"Third Office Action Issued in Chinese Patent Application No. 201110426257.X", Mailed Date: Dec. 1, 2015, 8 Pages.

* cited by examiner

STORING AND PUBLISHING CONTENTS OF A CONTENT STORE

BACKGROUND

By way of background, a content store provides storage for raw contents that are subsequently transformed and displayed to website users as web pages after a transformation process via a server. For web pages in which a high volume of contents are served, read requests to the content store may be load balanced by having multiple instances of the content store. For example, each instance may have a full set of contents capable of handling a subset of the request load.

Although a multiple instances design may solve a website's read load problem, it may create problems with respect to adding, updating, or removing content. Conventionally, content publishers have relied on a file replication tool, which has several undesirable limitations. For example, conventional content publishers do not guarantee data integrity across instances of a content store (i.e., some content may be available on particular instances of the store but not others). Also, since conventional content publishers do not support parallel publishing, concurrent publish requests are undesirably processed in an arbitrary order, one request at the time. To this end, publish time is often unpredictable since concurrent publish requests are arbitrarily processed one at a time. Furthermore, if content is being updated, such content is not available for read for the duration of update.

The above-described deficiencies of current methods are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure thereof, various aspects are described in connection with publishing the contents of a data store. In one such aspect, an apparatus is disclosed, which includes a processor configured to execute computer executable components stored in memory. Within such embodiment, the computer executable components include a content store component, a detection component, and a publishing component. The content store component is configured to perform a storage operation, whereas the detection component is configured to detect a completion of the storage operation. For this embodiment, the storage operation redundantly stores the contents of a content set onto a plurality of instances associated with a data store. The publishing component is then configured to publish the contents stored in the plurality of instances in response to the completion of the storage operation.

In another aspect, a method that facilitates publishing the contents of a data store is disclosed. This method includes performing a storage operation, and detecting a completion of the storage operation. Here, the storage operation redundantly stores the contents of a content set onto a plurality of instances associated with a data store. The method further includes publishing the contents of the content set stored in the plurality of instances in response to the completion of the storage operation.

In yet another aspect, a method that facilitates managing a publication of the contents from a dataset table is disclosed. This embodiment includes generating a dataset table to facilitate storing contents of a content set, which include payload and metadata. The method also includes storing the payload of the contents onto a payload table, and storing the metadata of the contents onto a metadata table. Here, the dataset table includes a foreign key to the payload table, whereas the metadata table includes a foreign key to the dataset table. The method further includes monitoring the dataset table to determine a storage status of the contents, and publishing the contents based on the storage status.

Other embodiments and various non-limiting examples, scenarios and implementations are described in more detail below.

DETAILED DESCRIPTION

Figure 1:
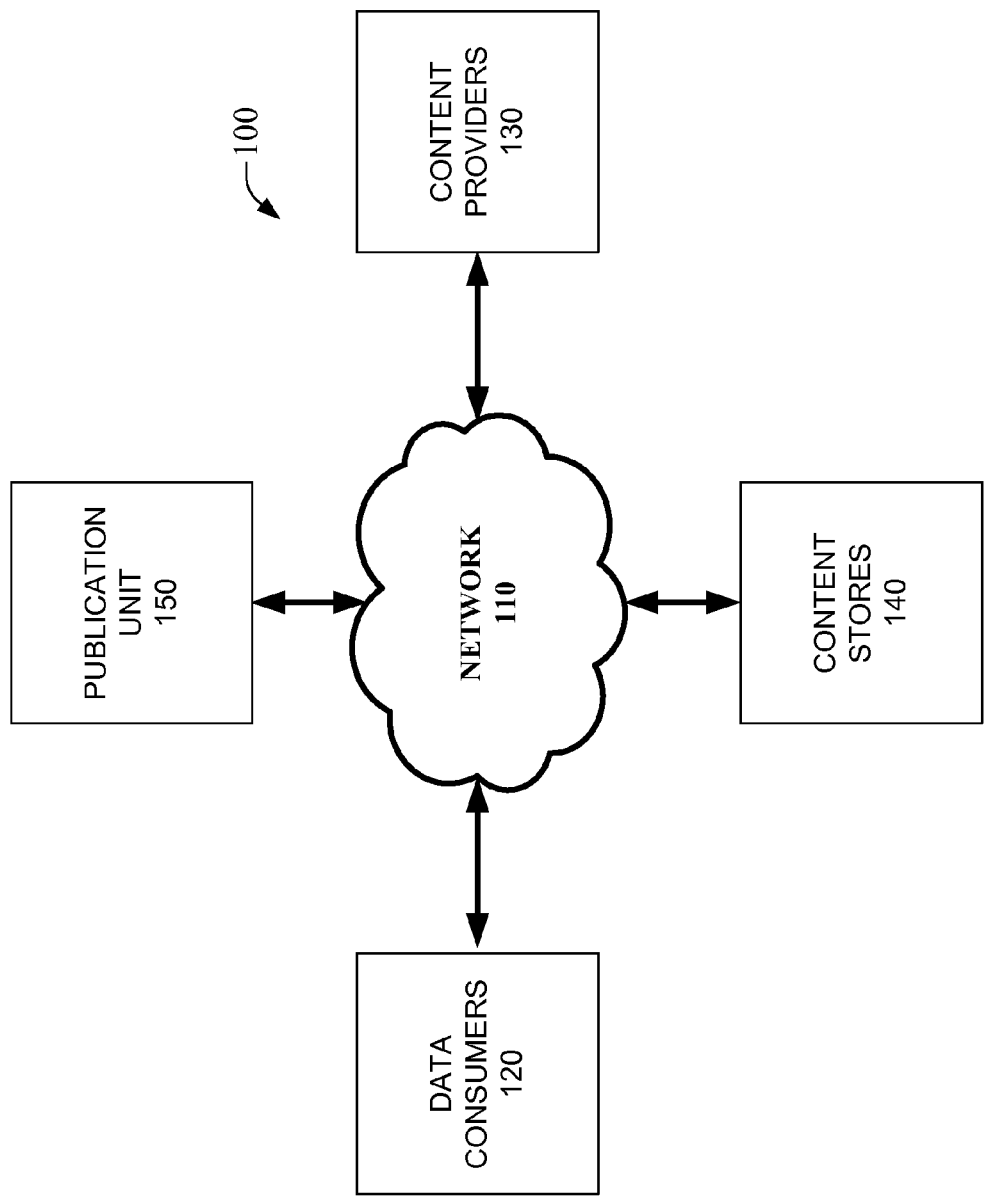
FIG. 1 is an overview of an exemplary system for publishing contents of a data store in accordance with an aspect of the subject specification.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Overview

As stated previously, read requests for web pages in which a high volume of contents are served may be load balanced by having such contents stored in multiple instances. For instance, content associated with particularly popular web pages may be stored redundantly across multiple instances to facilitate spikes in requests received from such web pages. This content, however, may include content that is added and/or updated frequently. Videos of popular television shows, for example, may be added regularly upon airing a new episode. Here, in order to accommodate high-volume demand for such episodes, multiple instances of corresponding video data can be stored across various machines. However, if new episodes are indeed stored redundantly across multiple machines, it would be desirable to synchronize the availability of such episodes. Synchronizing availability may, for example, ensure that that the newly added episode is uniformly available to all users simultaneously. Without such synchronization, it would thus be difficult to determine if and when a particular instance has been successfully updated to include video for the newly added episode. Moreover, it would be difficult to determine which, if any, of the multiple instances should be made available to users since the new episode may have not yet been stored successfully on some of those instances.

To this end, the subject specification discloses various aspects that facilitate storing and publishing contents associated with a multiple instances design. As described herein, "storing" contents is defined as the process of adding, updating, or removing data redundantly across multiple instances, whereas "publishing" contents is defined as the process of making the adding, updating, or removal of such data simultaneously available for read access from each of these instances. For example, "storing" contents may refer to adding, updating, or removing video corresponding to a particular television episode across multiple instances, whereas "publishing" contents may refer to making the adding, updating, or removal of such video simultaneously available for read access from each of these instances. Furthermore, as used herein, "content store" is defined as the set of instances associated with a particular storing/publishing process.

In order to implement an efficient multiple instances design, it is desirable to develop a storing and publishing mechanism that exhibits particular characteristics. For example, it is desirable to implement a mechanism capable of publishing the contents to multiple instances, while guaranteeing data integrity across all instances of a content store. Moreover, it is desirable for all instances of a content store to have the same exact content. It is also desirable for the mechanism to be fast such that publishing performance across all instances does not degrade linearly with the number of published instances.

Other desirable aspects are also contemplated. For instance, allowing parallel publish requests to a content store is desirable, as well as implementing a mechanism that does not block the content store from serving the contents during the publish process. It is also desirable for the mechanism to indicate that the publish process is complete and that the published contents are available on all instances of the content store. Furthermore, it is desirable for each publish request to include multiple content pieces, wherein all pieces are atomically available at the same time.

In an aspect, content is stored and published across multiple instances in two distinct steps. First, the storage step is performed in which the contents to be published are stored onto all instances of a content store in parallel. To this end such storage step includes adding, updating, or removing data to a final storage, wherein the adding, updating, or removal of such data is not yet available to consumers. Upon completion of the storage step, a publishing step is performed wherein the stored contents are made available to consumers at the same time on all instances of the store. Hereinafter, such publishing step is defined as a step in which data stored via the storage step is simultaneously made available at all endpoints.

Referring next to FIG. 1, an overview of an exemplary system for storing and publishing contents in accordance with an aspect is shown. As illustrated, system 100 includes data consumers 120, content providers 130, content stores 140, and publication unit 150, which are communicatively coupled via network 110. In an aspect, data consumers 120 request content from content providers 130 via network 110, wherein such requests may include requests for web pages and their corresponding content. Within such embodiment, content providers 130 provide content served by content stores 140. Moreover, it is contemplated that content stores 140 host content, wherein such content is stored and published based on instructions provided by publication unit 150.

Figure 2:
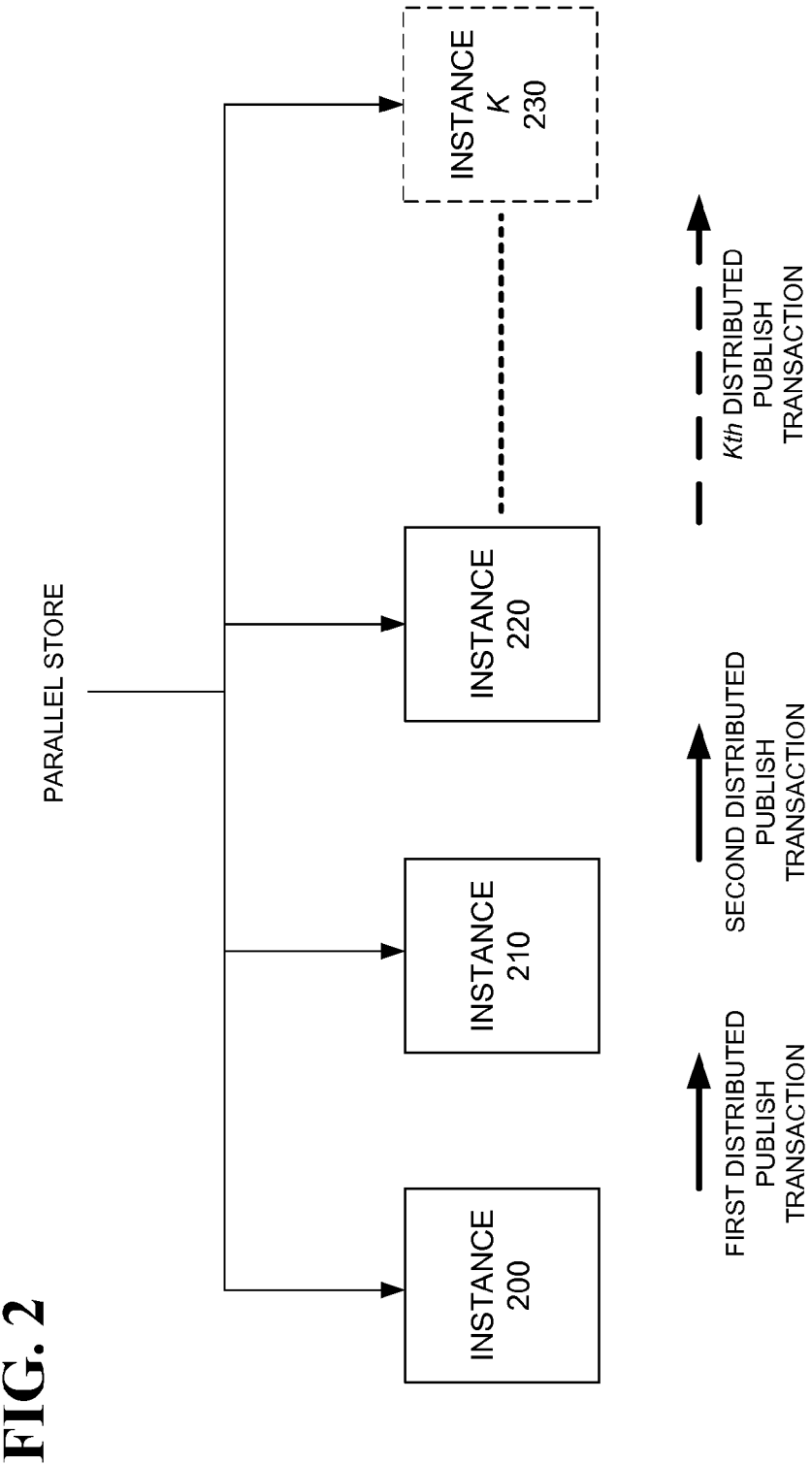
FIG. 2 is an illustration of an exemplary process for publishing contents of a content store according to an embodiment.

Referring next to FIG. 2, an exemplary process for storing and publishing contents via publication unit 150 according to an embodiment is provided. As shown, such mechanism may be split into two distinct steps. First, a storage step is performed in which content is stored onto a plurality of instances in parallel. For this particular example, content is stored onto K instances, which include instance 200, instance 210, instance 220, up to instance K 230. In an aspect, it is contemplated that failed attempts to store content onto any of instance 200, instance 210, instance 220, and/or instance K 230, are retried. Within such embodiment, if subsequent attempts to store contents continue to fail, the failed instance is removed from the storage operation.

Upon completing the storage step, a publishing step commences. Here, it should be noted that such publishing step can be implemented as a distributed transaction, which includes K individual publish transaction attempts. Namely, such distributed transaction links instances by individually ascertaining whether each instance is capable of publishing contents stored via the storage step. For instance, assuming instance 200 and instance 210 are indeed capable of publishing the stored contents, a first distributed publish transaction links instance 200 and instance 210, as shown. To this end, it is contemplated that failed attempts to publish content from any of instance 200, instance 210, instance 220, and/or instance K 230, can be retried. It should be appreciated that any of a plurality of reasons may cause a publish attempt to fail including, for example, lack of resources on a machine associated with a particular instance. If subsequent attempts to publish contents continue to fail, the failed instance is removed from the distributed transaction. Once the distributed transaction has been completed, each of the instances included in the distributed transaction are simultaneously committed for publishing to consumers.

Figure 3:
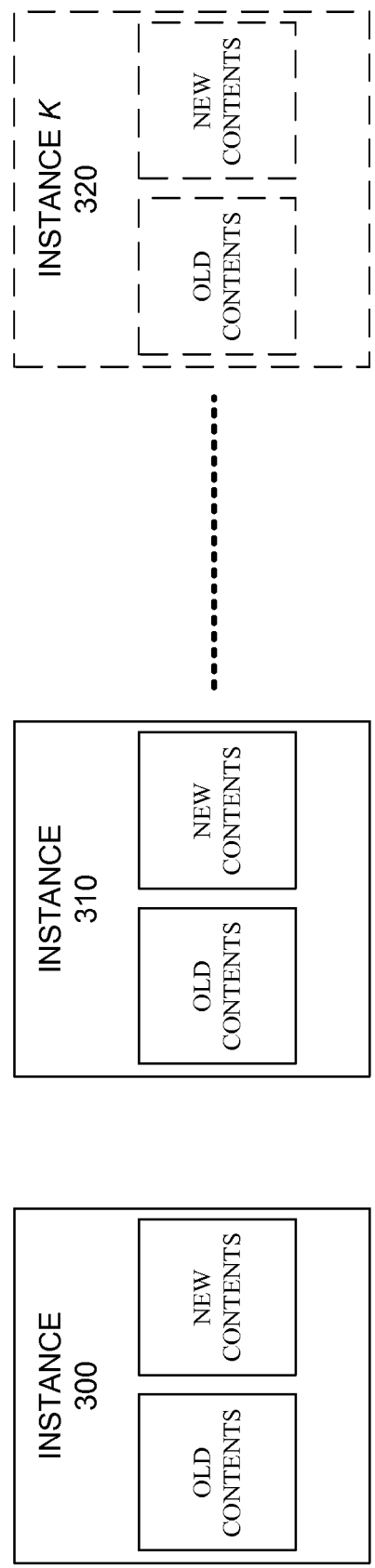
FIG. 3 is an illustration of exemplary instances comprising multiple content versions according to an embodiment.

In a further aspect, it is noted that multiple content versions may exist at any given time across multiple instances. For example, as illustrated in FIG. 3, each of instance 300, instance 310, and instance K 320, include old contents and new contents, wherein the old contents refer to contents prior to a storage operation, and wherein the new contents refer to contents subsequent to the storage operation. Here, it is contemplated that such old and new contents continue to coexist until a "clean-up" operation is performed. Moreover, it is contemplated that a clean-up operation is implemented in which old contents are periodically deleted from instance 300, instance 310, and/or instance K 320, as desired (e.g., deleted on a daily basis, according to availability of resources, etc.).

It should be noted that it may sometimes be desirable to publish old contents even after the new contents have been stored. With respect to publishing sports statistics in real time, for example, such feature may be particularly desirable since statistics are often nullified upon further review (e.g., via instant replay). To this end, since the disclosed mechanism is bifurcated into two steps, a publishing of the old contents can be performed after the storage step is completed, so long as the old contents remain in the content store. Namely, so long as the aforementioned clean-up operation has not yet occurred, multiple content versions will continue to reside in the content store. Accordingly, in an aspect, the publishing step may point at either a newer version of the contents or an older version of the contents.

Figure 4:
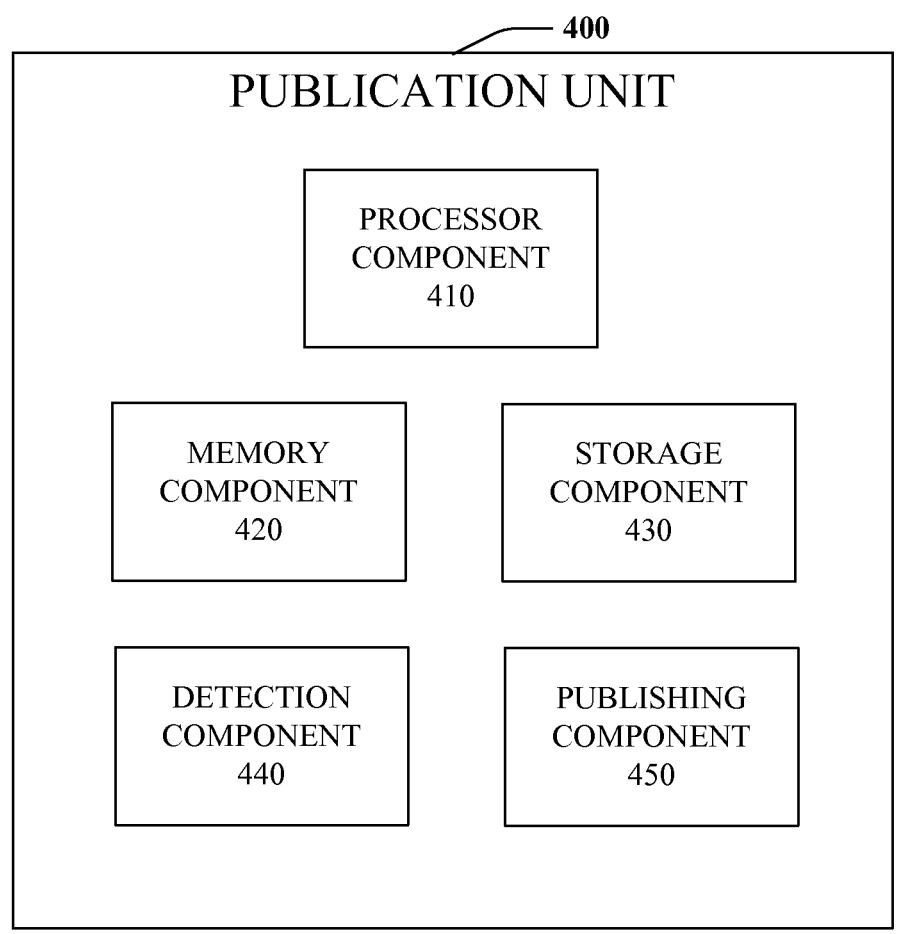
FIG. 4 illustrates a block diagram of an exemplary publication unit in accordance with an aspect of the subject specification.

Referring next to FIG. 4, a block diagram of an exemplary publication unit that facilitates storing and publishing contents according to an embodiment is provided. As shown, publication unit 400 may include processor component 410, memory component 420, storage component 430, detection component 440, and publishing component 450. Here, it should be noted that publication unit 400 is generally analogous to publication unit 150 shown in FIG. 1.

In one aspect, processor component 410 is configured to execute computer-readable instructions related to performing any of a plurality of functions. Processor component 410 can be a single processor or a plurality of processors dedicated to analyzing information to be communicated from publication unit 400 and/or generating information that can be utilized by memory component 420, storage component 430, detection component 440, and/or publishing component 450. Additionally or alternatively, processor component 410 may be configured to control one or more components of publication unit 400.

In another aspect, memory component 420 is coupled to processor component 410 and configured to store computer-readable instructions executed by processor component 410. Memory component 420 may also be configured to store any of a plurality of other types of data including data generated by any of storage component 430, detection component 440, and/or publishing component 450. Memory component 420 can be configured in a number of different configurations, including as random access memory, battery-backed memory, hard disk, magnetic tape, etc. Various features can also be implemented upon memory component 420, such as compression and automatic back up (e.g., use of a Redundant Array of Independent Drives configuration).

As illustrated, publication unit 400 can also include storage component 430, which is configured to perform a storage operation. In an aspect, such storage operation redundantly stores contents onto a plurality of storage locations associated with a content store such as content stores 140 illustrated in FIG. 1. In a particular embodiment, the storage operation is a parallel storage operation which redundantly stores contents onto a plurality of instances in parallel. Within such embodiment, storage component 430 is configured to retry a failed attempt to store the contents onto a particular instance, wherein such failure may be caused by any of a plurality of reasons (e.g., lack of resources on a machine associated with a particular instance), and wherein the number of attempts to store contents onto a particular instance may vary based on various factors (e.g., trade-off between volume of instances versus processing time). Here, it is contemplated that storage component 430 may be further configured to remove the particular instance from the parallel storage operation based on repeated failures to store the contents onto the particular instance. It is further contemplated that storage component 430 may be configured to implement a "clean-up" feature, wherein previously stored versions of the contents are periodically deleted (e.g., on a daily basis, according to a monitoring of resources, etc.). In another aspect, it should be noted that storage component 430 may be configured to perform the storage operation on at least one structured query language (SQL) database.

Publication unit 400 also includes detection component 440 and publishing component 450, as shown. Within such embodiment, detection component 440 is configured to detect a completion of the aforementioned storage operation (i.e., the finalization of contents being added, updated, or removed across the plurality of instances), whereas publishing component 450 is configured to publish the contents stored in the plurality of instances in response to the completion of the storage operation. In an aspect, publishing component 450 is configured to publish the contents via a distributed transaction, which attempts to publish the contents from each of the plurality of instances. It is contemplated that publishing component 450 may be configured to retry a failed attempt to publish (i.e., make available) the contents from a particular instance. Here, similar to the storage operation, it should be noted that such failure may be caused by any of a plurality of reasons (e.g., lack of resources on a machine associated with a particular instance). For this particular embodiment, publishing component 450 may be further configured to remove the particular instance from the distributed transaction based on a subsequent failure to publish the contents from the particular instance. Furthermore, in another aspect, publishing component 450 is configured to publish previously stored versions of the contents instead of newly stored versions of the contents, as desired. Indeed, for this particular embodiment, publishing component 450 may be configured to coordinate with storage component 430 to publish previously stored versions prior to a periodic "clean-up" operation in which such versions may be deleted and/or directed to an archive.

Figure 5:
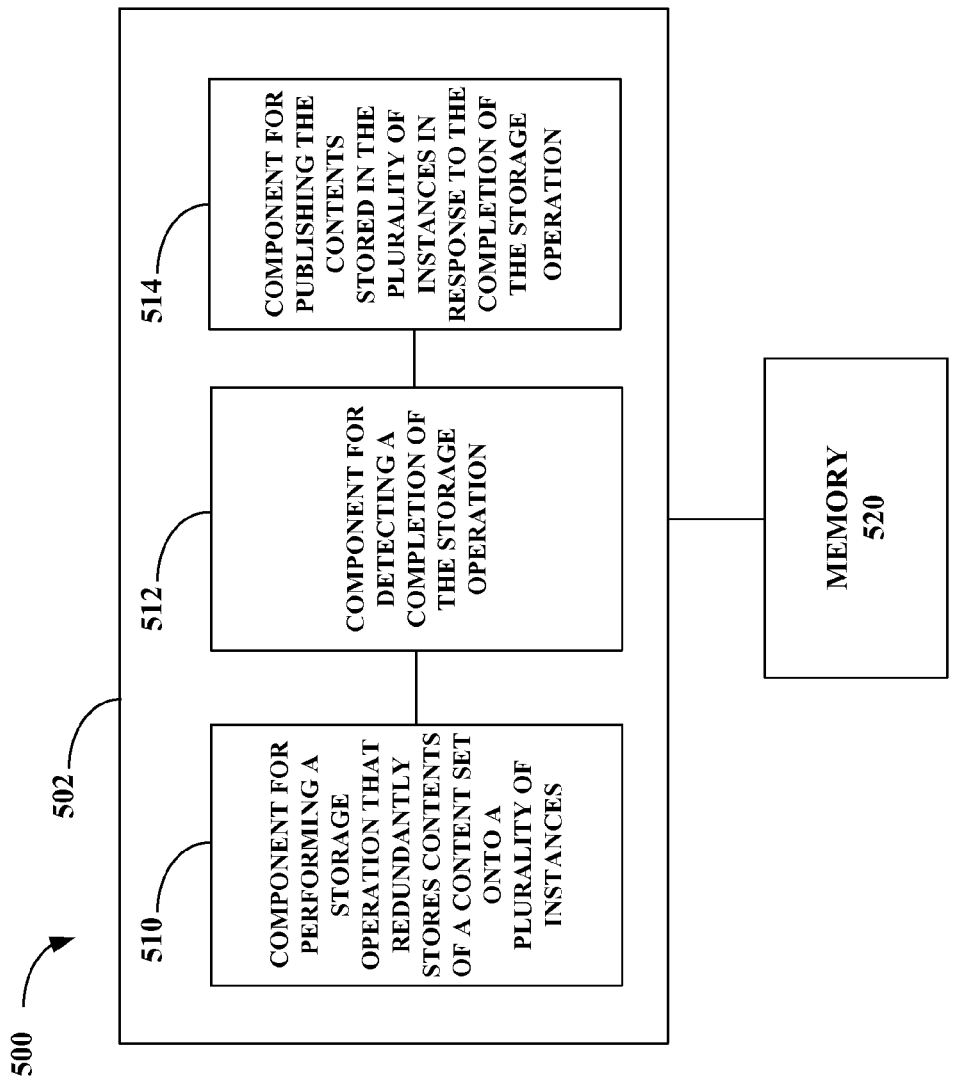
FIG. 5 is an illustration of an exemplary coupling of components that effectuate publishing contents of a content store in accordance with an embodiment.

Turning to FIG. 5, illustrated is a system 500 that facilitates publishing contents of a content store according to an embodiment. System 500 and/or instructions for implementing system 500 can reside within a computing device (e.g., publication unit 400) or a computer-readable storage medium, for instance. As depicted, system 500 includes functional blocks that can represent functions implemented by a processor, software, or combination thereof (e.g., firmware). System 500 includes a logical grouping 502 of components that can act in conjunction. As illustrated, logical grouping 502 can include a component for performing a storage operation that redundantly stores contents of a content set onto a plurality of instances 510. Logical grouping 502 can also include a component for detecting a completion of the storage operation 512. Further, logical grouping 502 can include a component for publishing the contents stored in the plurality of instances in response to the completion of the storage operation 514. Additionally, system 500 can include a memory 520 that retains instructions for executing functions associated with components 510, 512, and 514, wherein any of components 510, 512, and 514 can exist either within or outside memory 520.

Figure 6:
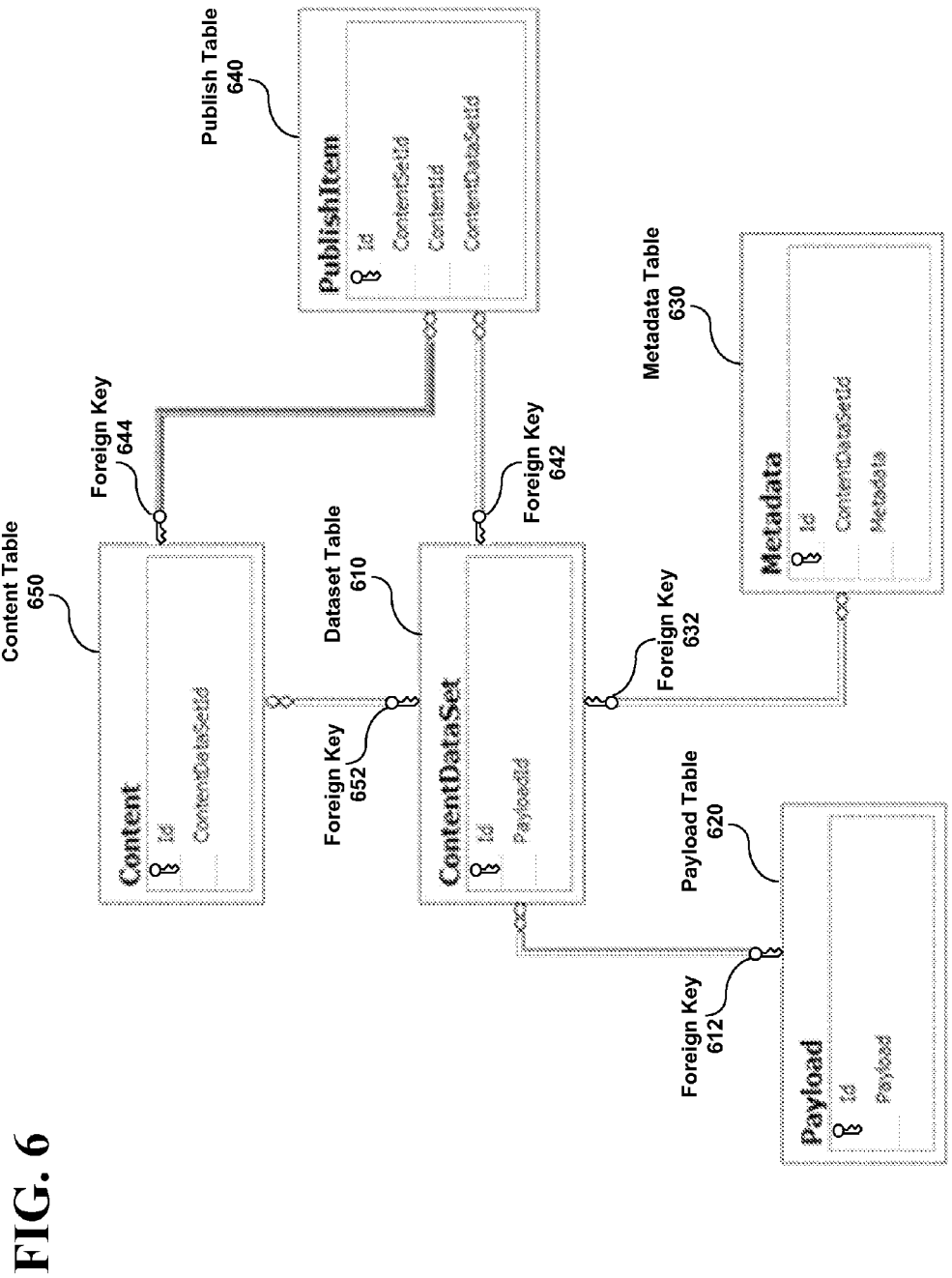
FIG. 6 is an illustration of exemplary tables that facilitate publishing contents of a content store in accordance with an embodiment.

Referring next to FIG. 6, an illustration of exemplary tables is provided which facilitate storing and publishing contents of a content store in accordance with an embodiment. As illustrated, such exemplary tables may include dataset table 610, payload table 620, metadata table 630, publish table 640, and content table 650. Here, in a particular aspect, it is contemplated that a Content Publisher invokes a Store Contents process for all contents that are part of a Content Set. For each of the contents to be stored, the Content Publisher calls a StoreContent application programming interface (API) to facilitate the Store Contents process. For instance, such API may be utilized to create a Content Data Set row in dataset table 610, wherein content data is stored as rows in various other tables with relationships to the Content Data Set row. In an aspect, if this is a new content (i.e., content to be added), then a new row is also created in content table 650 with an empty ContentDataSetId. To this end, it is contemplated that such process is done in parallel across all instances of a content store.

As illustrated in FIG. 6, content stored in ContentDataSet Table 610 is associated with a corresponding Payload and Metadata. In a particular embodiment, there is only one payload associated with a particular content. Within such embodiment, ContentDataSet-Payload relationships are described by foreign key 612 in dataset table 610. Here, it should be noted that foreign keys such as foreign key 612 identify a column or a set of columns in one (referencing) table that refers to a set of columns in another (referenced) table. To this end, foreign keys can also be used to describe any other one to one relationship of content data. With respect to metadata table 630, it is further noted that multiple metadata parts may be associated with a particular content. For this embodiment, ContentDataSet-Metadata relationships are described by foreign key 632 in metadata table 630, wherein such descriptions can be used for any one-to-many relationship of content data.

In an aspect, each ContentDataSet row in a dataset table 610 is associated with a row in a publish table 640. Here, it is contemplated that a publish table 640 can be used to keep track of all content pieces that have been stored but are not yet published. To facilitate such tracking, each PublishItem within a publish table 640 may be associated with a ContentDataSet within a dataset table 610, which is subsequently made available as a set (e.g., defined by a ContentSetId) when a Publish Contents process is completed. To this end, it is noted that a publish table 640 may include foreign key 642 to describe the relationship between publish table 640 and dataset table 610, as well as foreign key 644 to describe the relationship between publish table 640 and content table 650. It is further noted that the relationship between content table 650 and dataset table 610 is utilized as part of the Publish Contents process and described by foreign key 652 in content table 650.

Figure 7:
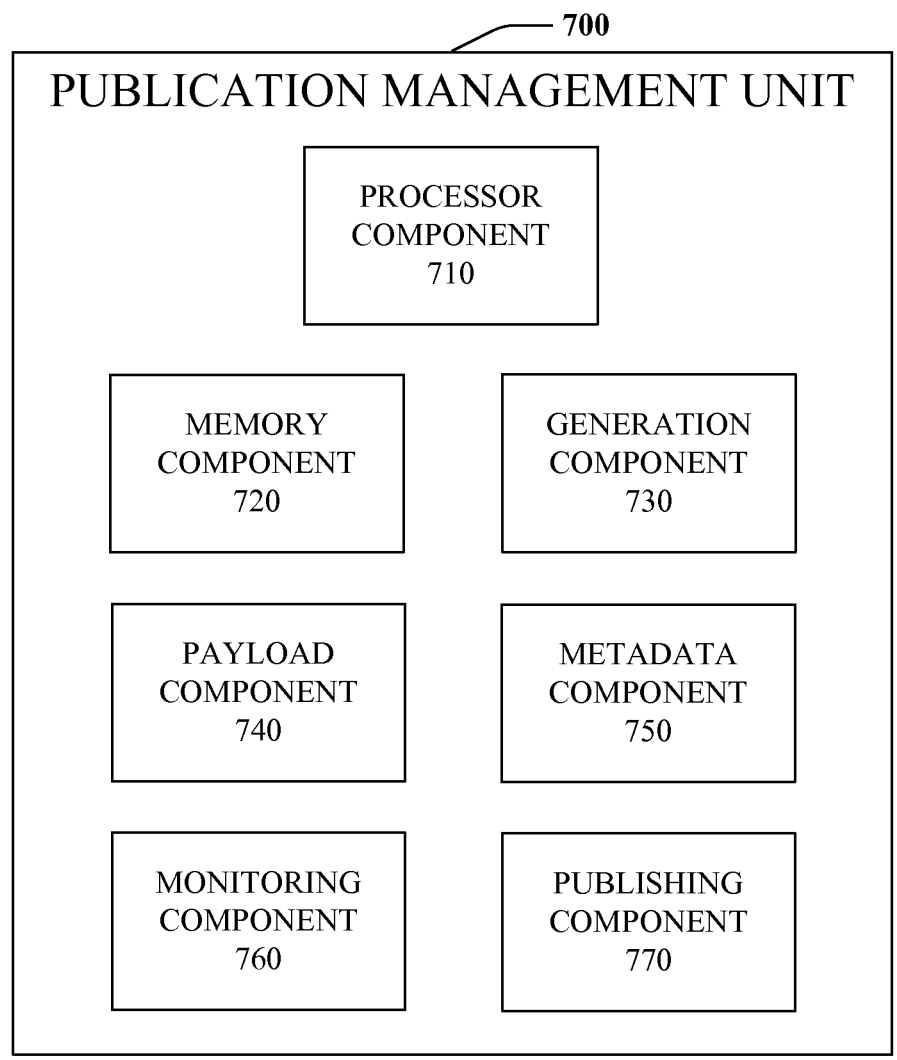
FIG. 7 is a block diagram of an exemplary publication management unit in accordance with an aspect of the subject specification.

In an aspect, when all contents in a set are stored in dataset table 610, the Publish Contents process then makes all those stored contents available for consumption. To facilitate such process, the a PublishContent API is called with a specific ContentSetId. Within such embodiment, the PublishContent API creates a distributed transaction spanning all valid instances of a Content Store. Moreover, the contents previously stored by the Store Contents process are "activated" in a single transaction. For instance, publish table 640 can be monitored for rows that belong to a ContentSetId. Relationships can then be created between content table 650 and dataset table 610. Once this process is completed for all contents in a set and for all instances of the content store, the distributed transaction is committed across all valid instances, which makes the entire Content Set available Referring next to FIG. 7, a block diagram illustrates an exemplary publication management unit configured to manage a publication of contents from a dataset table in accordance with various aspects. As illustrated, publication management unit 700 may include processor component 710, memory component 720, generation component 730, payload component 740, metadata component 750, monitoring component 760, and publishing component 770. Here, it should be noted that publication management unit 700 may reside within publication unit 150 shown in FIG. 1

Similar to processor component 410 in publication unit 400, processor component 710 is configured to execute computer-readable instructions related to performing any of a plurality of functions. Processor component 710 can be a single processor or a plurality of processors dedicated to analyzing information to be communicated from publication management unit 700 and/or generating information that can be utilized by memory component 720, generation component 730, payload component 740, metadata component 750, monitoring component 760, and/or publishing component 770. Additionally or alternatively, processor component 710 may be configured to control one or more components of publication management unit 700.

In another aspect, memory component 720 is coupled to processor component 710 and configured to store computer-readable instructions executed by processor component 710. Memory component 720 may also be configured to store any of a plurality of other types of data including data generated by any of generation component 730, payload component 740, metadata component 750, monitoring component 760, and/or publishing component 770. Here, it should be noted that memory component 720 is analogous to memory component 420 in publication unit 400. Accordingly, it should be appreciated that any of the aforementioned features/configurations of memory component 420 are also applicable to memory component 720.

In yet another aspect, publication management unit 700 includes generation component 730, which is configured to generate a dataset table (e.g., dataset table 610). For instance, generation component 730 may be configured to generate a dataset table which facilitates storing contents of a content set. Here, it should be noted that such contents may be replicated onto any of a plurality of locations (e.g., a plurality of SQL databases), wherein the storing and publishing of these contents can be managed via a dataset table generated by generation component 730.

For some embodiments, it is contemplated that contents may be associated with a corresponding payload and metadata. To facilitate such embodiments, publication management unit 700 may include payload component 740 and metadata component 750, as illustrated. In an aspect, payload component 740 can be configured to store the payload of the contents into a payload table (e.g., payload table 620), whereas metadata component 750 can be configured to store the metadata of the contents onto a metadata table (e.g., metadata table 630). Here, as stated previously with respect to FIG. 6, relationships between tables are describable via foreign keys. For example, dataset tables generated by generation component 730 may include a foreign key to the payload table (i.e., to facilitate describing a potential one-to-one relationship between a contents table and a payload table), whereas metadata tables may include a foreign key to the dataset table (i.e., to facilitate describing a potential one-to-many relationship between a contents table and a metadata table).

As illustrated, publication management unit 700 may also include monitoring component 760. Within such embodiment, monitoring component 760 may be configured to monitor dataset tables generated by generation component 730. In particular, monitoring component 760 can be configured to determine a storage status of the contents (e.g., determining whether a storage operation is complete). Publishing component 770 may then be configured to publish the contents based on the storage status. For instance, publishing component 770 can be configured to forego publishing contents until receiving a confirmation that the storage of the contents has been committed across a plurality of desired instances. To this end, it should be noted that publishing component 770 can be configured to publish the contents from the plurality of instances via a distributed transaction. Within such embodiment, publishing component 770 is further configured to retry a failed attempt to publish the contents from a particular instance. Indeed, since subsequent publication attempts may also fail, publishing component 770 may be configured to remove the particular instance from the distributed transaction based on the subsequent failure to publish the contents from the particular instance. Upon completing the distributed transaction, publishing component 770 may then be configured to publish content stored in the plurality of instances included in the transaction simultaneously.

Figure 8:
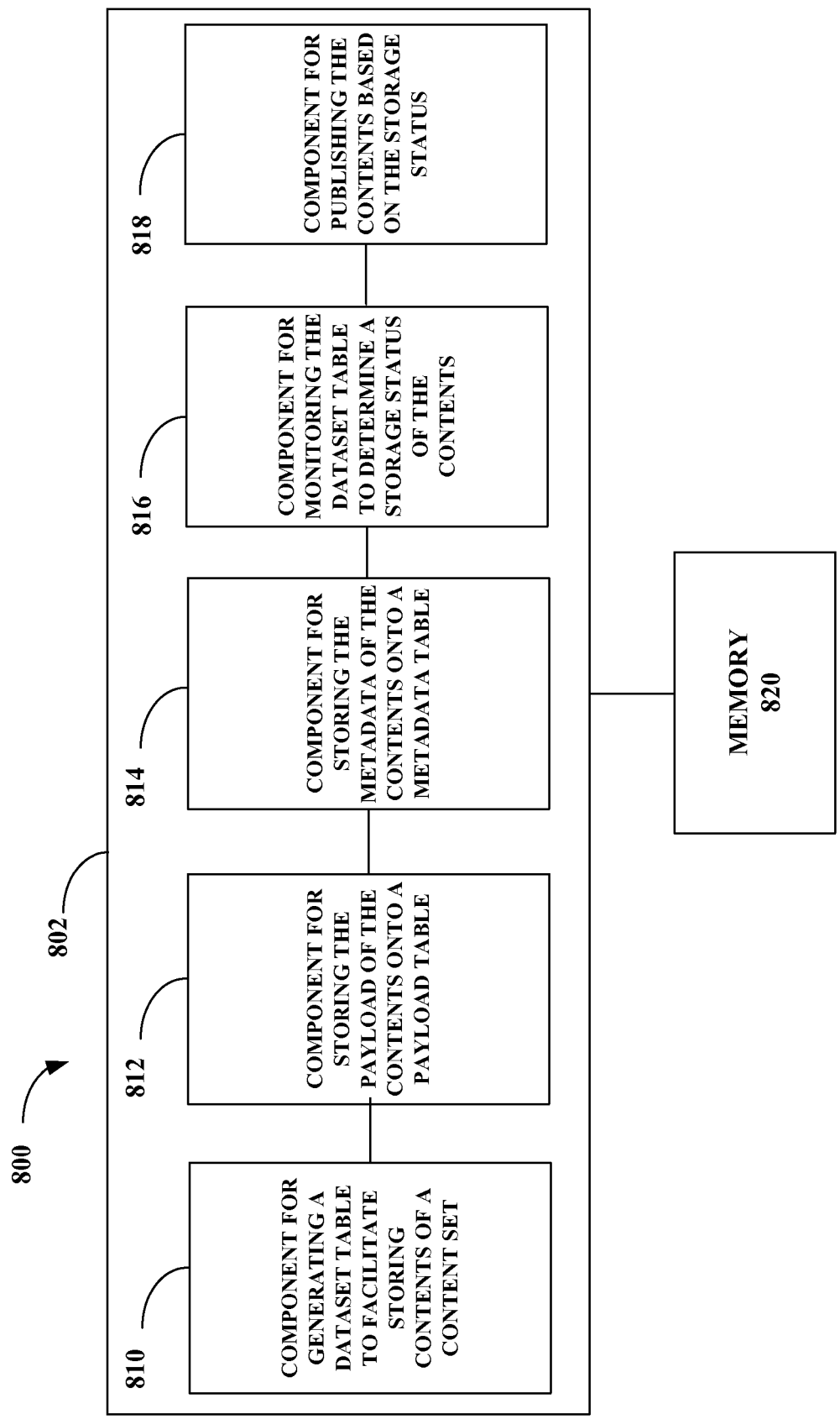
FIG. 8 is an illustration of an exemplary coupling of components that effectuate managing a publication of contents from a dataset table in accordance with an embodiment.

Turning to FIG. 8, illustrated is a system 800 that facilitates managing a publication of contents from a dataset table according to an embodiment. System 800 and/or instructions for implementing system 800 can reside within a computing device (e.g., publication management unit 700) or a computer-readable storage medium, for instance. As depicted, system 800 includes functional blocks that can represent functions executed by a processor. Moreover, system 800 includes a logical grouping 802 of components that can act in conjunction similar to logical grouping 502 in system 500. As illustrated, logical grouping 802 can include a component for generating a dataset table to facilitate storing contents of a content set 810, as well as a component for storing the payload of the contents onto a payload table 812. Logical grouping 802 can also include a component for storing the metadata of the contents onto a metadata table 814. Further, logical grouping 802 can include a component for monitoring the dataset table to determine a storage status of the contents 816, as well as a component for publishing the contents based on the storage status 818. Additionally, system 800 can include a memory 820 that retains instructions for executing functions associated with components 810, 812, 814, 816, and 818. While shown as being external to memory 820, it is to be understood that components 810, 812, 814, 816, and 818 can exist within memory 820.

Figure 9:
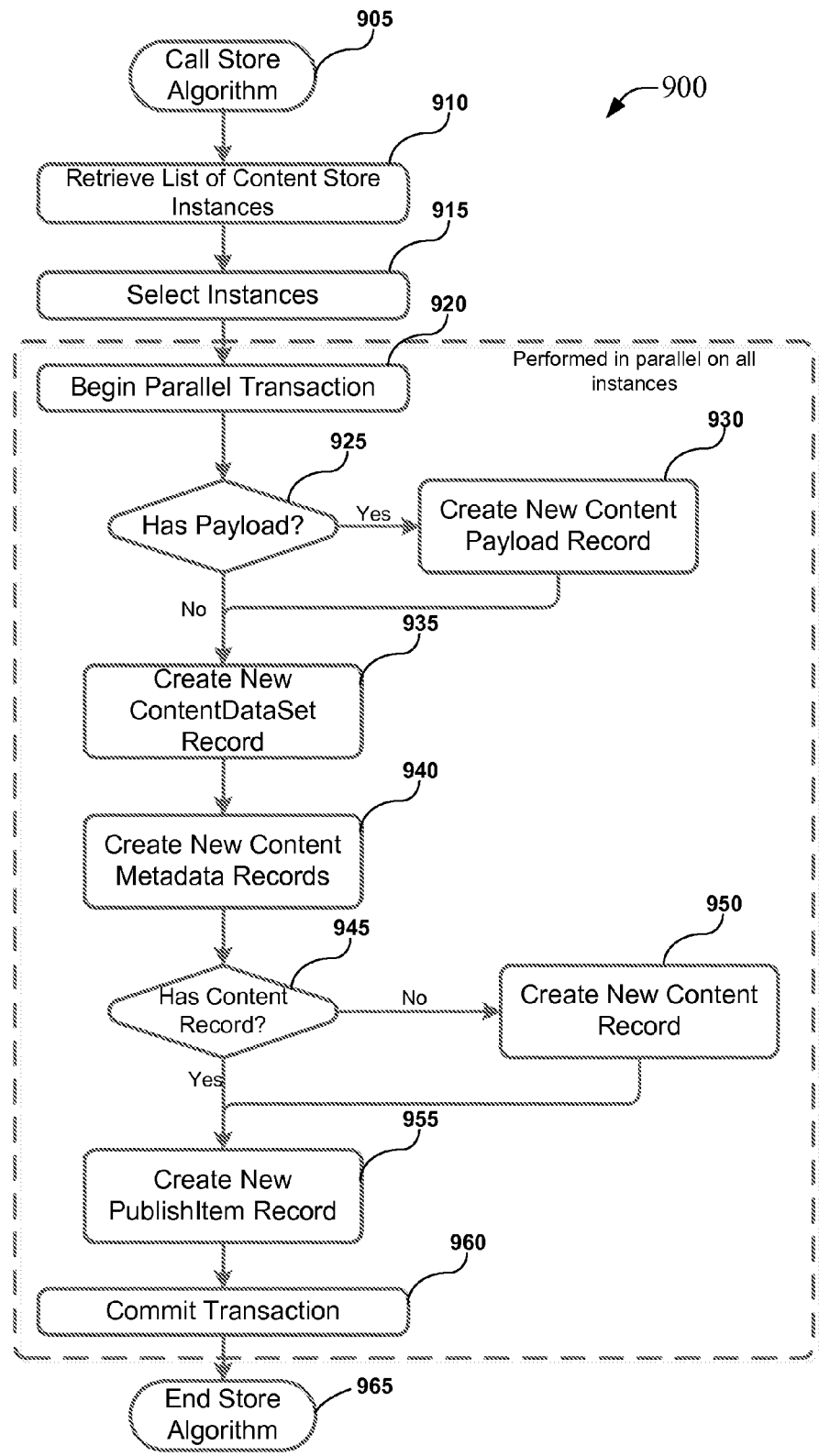
FIG. 9 is a flow diagram illustrating an exemplary methodology for storing contents in accordance with an embodiment.

As stated previously, it is contemplated that content is stored and published across multiple instances in two distinct steps. Referring next to FIG. 9, a flow chart illustrating an exemplary method 900 that facilitates storing contents according to an embodiment is provided. As illustrated, method 900 includes a series of acts that may be performed by a computing device according to an aspect of the subject specification. For instance, method 900 may be implemented by employing a processor to execute computer executable instructions stored on a computer readable storage medium to implement the series of acts. In another embodiment, a computer-readable storage medium comprising code for implementing the series of acts is disclosed.

As illustrated, method 900 begins by calling a store algorithm at act 905. For this particular example, a list of content store instances is retrieved at act 910, and a subset of instances within the list is subsequently selected at act 915. In an aspect, content is then stored via a parallel transaction onto each of the selected instances beginning at act 920.

To this end, it is contemplated that method 900 may determine whether particular content includes a payload at act 925. If the content includes a payload, a new content payload record is created at act 930 followed by a new ContentDataSet record being created at act 935. Otherwise, if it is determined at act 925 that the content does not include a payload, method 900 proceeds directly to act 935.

Once a ContentDataSet record has been created at act 935, new content metadata records describing the ContentData Set record are subsequently created at act 940. Method 900 then determines whether particular content includes a record at act 945. If the content does not already include a record, a new content record is created at act 950 followed by a new PublishItem record being created at act 955. Otherwise, if it is determined at act 945 that the content indeed already includes a record, method 900 proceeds directly to act 955.

For this particular example, once a new PublishItem record has been created, method 900 can proceed to act 960 where the parallel store transaction can be committed. Moreover, since the transaction stores content onto instances in parallel, it is contemplated that committing such parallel transaction comprises simultaneously committing each of the instances in which the content has been successfully stored. Method 900 then concludes at act 965 where the store algorithm ends.

Figure 10:
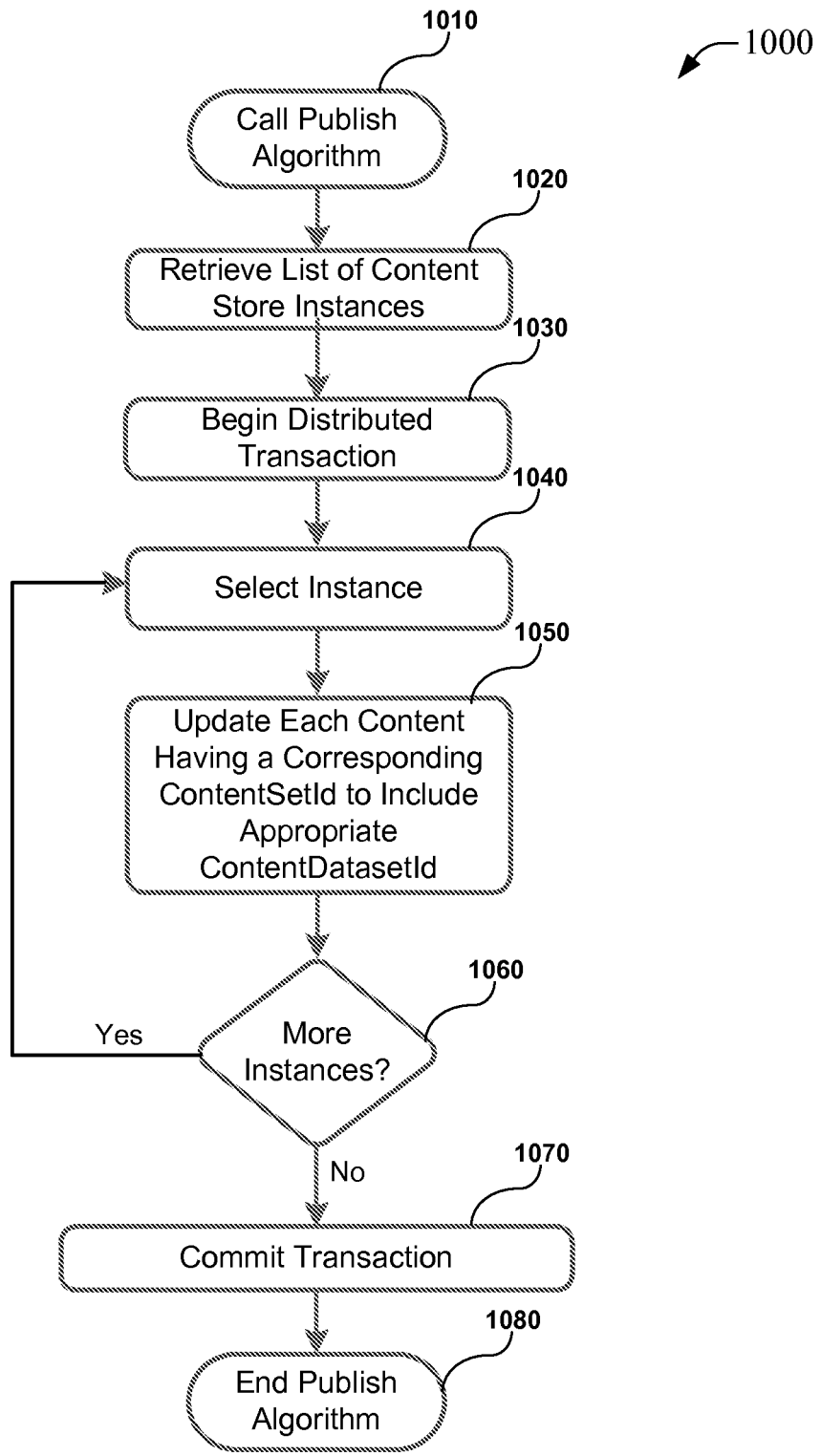
FIG. 10 is a flow diagram illustrating an exemplary methodology for publishing contents in accordance with an embodiment.

Referring next to FIG. 10, a flow chart illustrating an exemplary method 1000 that facilitates publishing contents according to an embodiment is provided. Here, it is noted that the process of publishing such contents is a distinct step that does not begin until the storage process described in FIG. 9 is complete. As illustrated, method 1000 includes a series of acts that may be performed by a computing device according to an aspect of the subject specification. For instance, method 1000 may be implemented by employing a processor to execute computer executable instructions stored on a computer readable storage medium to implement the series of acts. In another embodiment, a computer-readable storage medium comprising code for implementing the series of acts is contemplated.

As illustrated, method 1000 begins by calling a publish algorithm at act 1010. For this particular example, a list of content store instances is retrieved at act 1020, wherein a distributed publishing transaction is subsequently commenced at act 1030. Moreover, it is contemplated that such distributed transaction is performed on a plurality of instances selected at act 1040.

Once an instance is selected, each of the contents having a corresponding ContentSetId is updated at act 1050 to include an appropriate ContentDatasetId. Method 1000 may then proceed to act 1060 where a determination is performed of whether additional instances are included in the distributed transaction. If additional instances are indeed included, method 1000 loops back to act 1040 where a subsequent instance is selected. Otherwise, if it is determined at act 1060 that no additional instances are included, method 1000 proceeds to act 1070 where the distributed publishing transaction is committed. To this end, it is contemplated that committing such distributed transaction comprises simultaneously committing each of the instances in which the content has been successfully published. Method 1000 then concludes at act 1080 where the publish algorithm ends. Upon conclusion of the publish algorithm, content within instances included in the distributed transaction is made available for read access.

Exemplary Networked and Distributed Environments

One of ordinary skill in the art can appreciate that the various embodiments of methods and devices for publishing contents of a content store and related embodiments described herein can be implemented in connection with any computer or other client or server device. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 11:
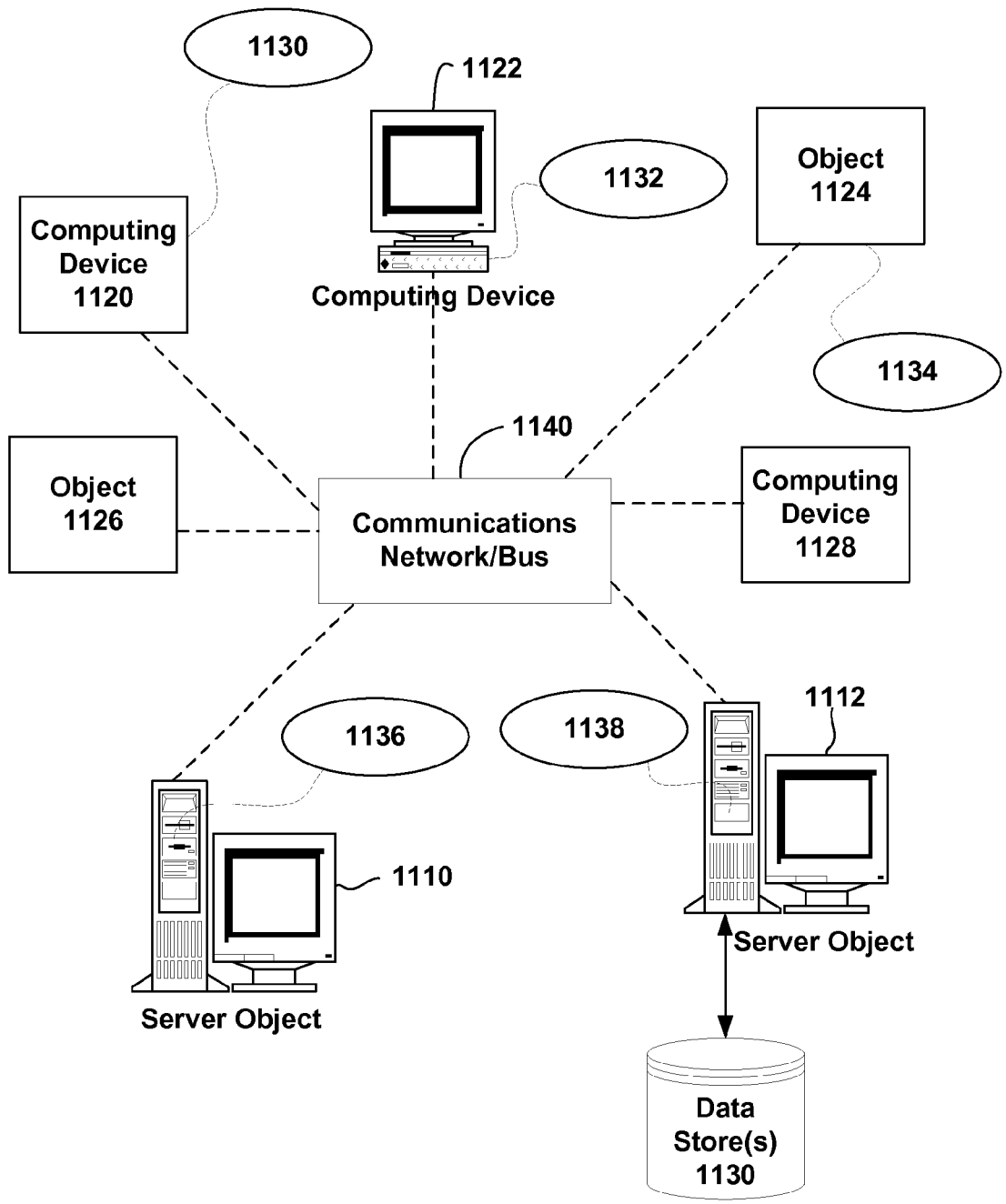
FIG. 11 is a block diagram representing exemplary non-limiting networked environments in which various embodiments described herein can be implemented.

FIG. 11 provides a non-limiting schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138. It can be appreciated that objects 1110, 1112, etc. and computing objects or devices 1120, 1122, 1124, 1126, 1128, etc. may comprise different devices, such as PDAs, audio/video devices, mobile phones, MP3 players, laptops, etc.

Each object 1110, 1112, etc. and computing objects or devices 1120, 1122, 1124, 1126, 1128, etc. can communicate with one or more other objects 1110, 1112, etc. and computing objects or devices 1120, 1122, 1124, 1126, 1128, etc. by way of the communications network 1140, either directly or indirectly. Even though illustrated as a single element in FIG. 11, network 1140 may comprise other computing objects and computing devices that provide services to the system of FIG. 11, and/or may represent multiple interconnected networks, which are not shown. Each object 1110, 1112, etc. or 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of an infrastructure for information as a service from any platform as provided in accordance with various embodiments.

It should be noted that a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 11, as a non-limiting example, computers 1120, 1122, 1124, 1126, 1128, etc. can be thought of as clients and computers 1110, 1112, etc. can be thought of as servers where servers 1110, 1112, etc. provide data services, such as receiving data from client computers 1120, 1122, 1124, 1126, 1128, etc., storing of data, processing of data, transmitting data to client computers 1120, 1122, 1124, 1126, 1128, etc., although any computer can be considered a client, a server, or both, depending on the circumstances. Any of these computing devices may be processing data, or requesting services or tasks that may implicate an infrastructure for information as a service from any platform and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 1140 is the Internet, for example, the servers 1110, 1112, etc. can be Web servers with which the clients 1120, 1122, 1124, 1126, 1128, etc. communicate via any of a number of known protocols, such as HTTP. Servers 1110, 1112, etc. may also serve as clients 1120, 1122, 1124, 1126, 1128, etc., as may be characteristic of a distributed computing environment.

Exemplary Computing Device

As mentioned, various embodiments described herein apply to any device wherein it may be desirable to implement one or pieces of an infrastructure for publishing contents of a content store. It should be understood, therefore, that handheld, portable and other computing devices and computing objects of all kinds are contemplated for use in connection with the various embodiments described herein, i.e., anywhere that a device may provide some functionality in connection with an infrastructure for information as a service from any platform. Accordingly, the general purpose computer described below in FIG. 12 is but one example, and the embodiments of the subject disclosure may be implemented with any client having network/bus interoperability and interaction.

Figure 12:
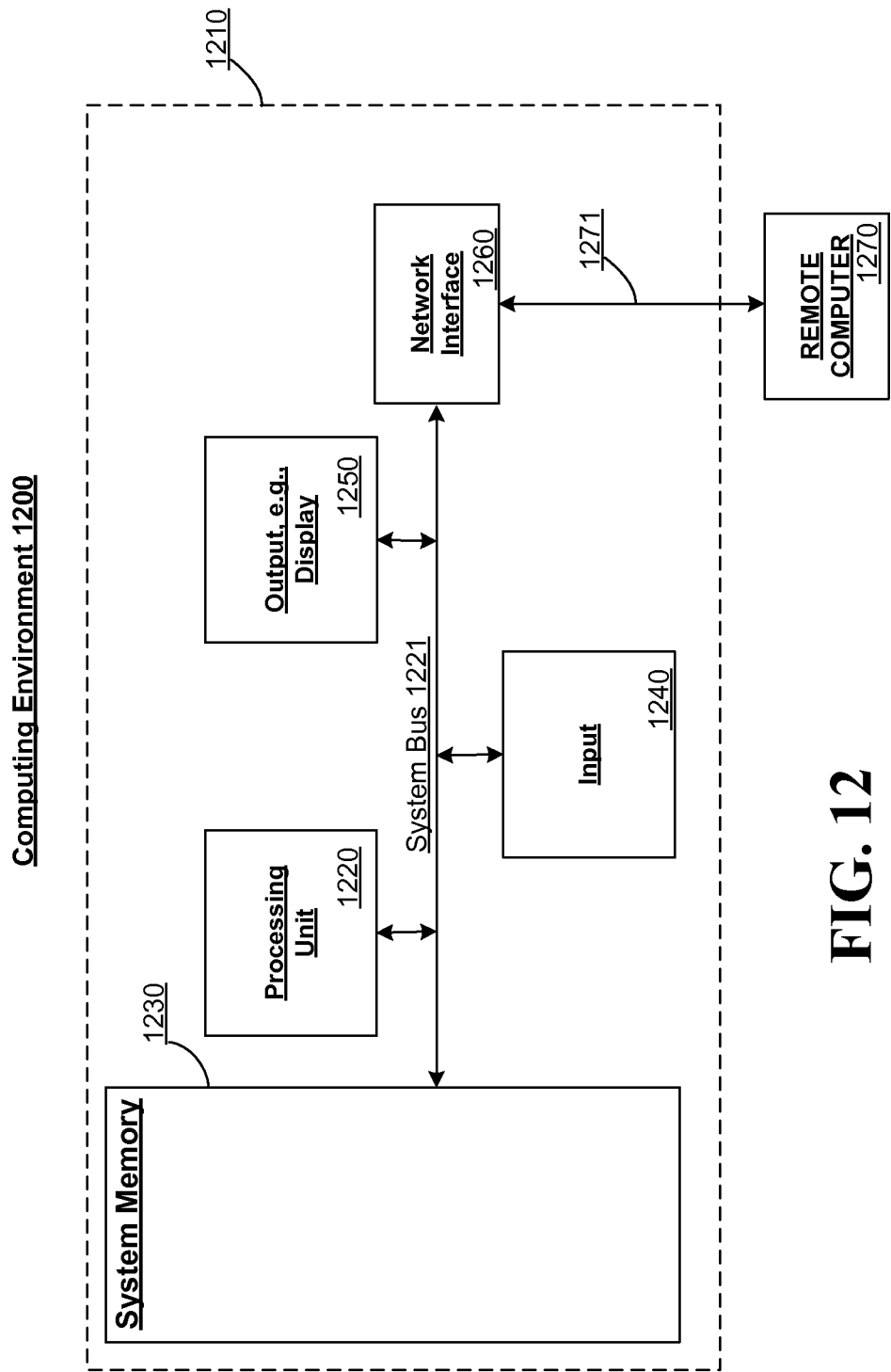
FIG. 12 is a block diagram representing an exemplary non-limiting computing system or operating environment in which one or more aspects of various embodiments described herein can be implemented.

With reference to FIG. 12, an exemplary computing environment 1200 for implementing one or more embodiments herein can include a general purpose computing device in the form of a handheld computer 1210. Components of handheld computer 1210 may include, but are not limited to, a processing unit 1220, a system memory 1230, and a system bus 1221 that couples various system components including the system memory to the processing unit 1220.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, memory 1230 may also include an operating system, application programs, other program modules, and program data.

A user may enter commands and information into the computer 1210 through input devices 1240 A monitor or other type of display device is also connected to the system bus 1221 via an interface, such as output interface 1250. In addition to a monitor, computers may also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1271, such local area network (LAN) or a wide area network (WAN), but may also include other networks/buses. Such networking environments are commonplace in homes, offices, enterprise-wide computer networks, intranets and the Internet.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

While the various embodiments have been described in connection with the preferred embodiments of the various figures, it is to be understood that other similar embodiments may be used or modifications and additions may be made to the described embodiment for performing the same function without deviating there from. Still further, one or more aspects of the above described embodiments may be implemented in or across a plurality of processing chips or devices, and storage may similarly be affected across a plurality of devices. Therefore, the present invention should not be limited to any single embodiment, but rather should be construed in breadth and scope in accordance with the appended claims.

What is claimed is:

1. An apparatus comprising:
   a storage component configured to perform a storage operation which redundantly stores a copy of contents of a content set onto each of a plurality of instances of a content store;
   a detection component configured to detect that the storage operation has successfully completed; and
   a publishing component configured to, in response to detecting the successful completion of the storage operation, issue a distributed transaction which causes each of the plurality of instances of the content store to simultaneously allow read access to the contents of the content set stored on the each of the plurality of instances of the content store.

2. The apparatus of claim 1, wherein the storage component is configured to periodically delete previously stored versions of the contents.

3. The apparatus of claim 1, wherein the publishing component is configured to publish previously stored versions of the contents instead of newly stored versions of the contents.

4. The apparatus of claim 1, wherein the storage operation redundantly stores the contents onto the plurality of instances simultaneously.

5. The apparatus of claim 4, wherein the storage component is configured to restart an attempt to store the contents onto a particular instance if a previous attempt to store the contents has failed, and wherein the storage component is further configured to remove the particular instance from the storage operation based on a subsequent failure to store the contents onto the particular instance.

6. The apparatus of claim 1, wherein the distributed transaction attempts to publish the contents from each of the plurality of instances.

7. The apparatus of claim 6, wherein the publishing component is configured to restart an attempt to publish the contents from a particular instance if a previous attempt to publish the contents has failed, and wherein the publishing component is further configured to remove the particular instance from the distributed transaction based on a subsequent failure to publish the contents from the particular instance.

8. The apparatus of claim 1, wherein the storage component is configured to perform the storage operation on at least one structured query language (SQL) database.

9. A method implemented in a computer, the method comprising:
   performing a storage operation which redundantly stores a copy of contents of a content set onto each of a plurality of instances of a content store;
   detecting that the storage operation has successfully completed; and
   in response to detecting the successful completion of the storage operation, issuing a distributed transaction which causes each of the plurality of instances of the content store to simultaneously allow read access to the contents of the content set stored on the each of the plurality of instances of the content store.

10. The method of claim 9, wherein the performing of the storage operation comprises periodically deleting previously stored versions of the contents.

11. The method of claim 9, further comprising publishing a previously stored version of the contents on one or more of the plurality of instances of the content store.

12. The method of claim 9, wherein the performing of the storage operation comprises redundantly storing the contents onto the plurality of instances in parallel.

13. The method of claim 12, further comprising restarting an attempt to store the contents onto a particular instance if a previous attempt to store the contents has failed, wherein the performing of the storage operation comprises removing the particular instance from the storage operation based on a subsequent failure to store the contents onto the particular instance.

14. The method of claim 9, wherein the distributed transaction attempts to publish the contents from each of the plurality of instances.

15. The method of claim 14, further comprising restarting an attempt to publish the contents from a particular instance if a previous attempt to publish the contents has failed, and, upon a subsequent failure to publish the contents from the particular instance, removing the particular instance from the distributed transaction.

16. The method of claim 9, wherein the performing of the storage operation comprises storing the contents on at least one structured query language (SQL) database.

* * * * *